(12) United States Patent
Håland et al.

(10) Patent No.: US 6,416,126 B1
(45) Date of Patent: Jul. 9, 2002

(54) VEHICLE SEAT

(75) Inventors: Yngve Håland, Falsterbo; Ola Boström, Alingsås, both of (SE)

(73) Assignee: Autoliv Development AB, Vårgårda (SE)

(*) Notice: Subject to any disclaimer, the term of this patent is extended or adjusted under 35 U.S.C. 154(b) by 0 days.

(21) Appl. No.: 09/486,963

(22) PCT Filed: Sep. 7, 1998

(86) PCT No.: PCT/SE98/01579
§ 371 (c)(1),
(2), (4) Date: May 23, 2000

(87) PCT Pub. No.: WO99/12766
PCT Pub. Date: Mar. 18, 1999

(30) Foreign Application Priority Data

Sep. 10, 1997 (GB) .............................................. 9719263

(51) Int. Cl.[7] ............................. B60N 2/42; B60R 21/00
(52) U.S. Cl. ............................. 297/216.13; 297/216.14; 297/216.19
(58) Field of Search ....................... 297/216.13, 216.18, 297/216.19, 216.14

(56) References Cited

U.S. PATENT DOCUMENTS 5,366,268 A * 11/1994 Miller et al. ........... 297/216.13
5,823,619 A * 10/1998 Heilig et al. ........... 297/216.13
6,033,018 A * 3/2000 Fohl ........................ 297/216.13

FOREIGN PATENT DOCUMENTS

| EP | 0 556 884 | 8/1993 |
| GB | 1 228 657 | 4/1971 |
| GB | 1 441 680 | 7/1976 |
| GB | 2 311 212 | 9/1997 |
| WO | 97/10117 | 3/1997 |

* cited by examiner

Primary Examiner—Anthony D. Barfield
(74) Attorney, Agent, or Firm—Venable; Robert Kinberg

(57) ABSTRACT

A vehicle seat comprises a squab and a back which is mounted for pivotal movement relative to the squab. The seat incorporates an energy absorbing force limiter adapted to absorb energy as the back of the seat moves rearwardly when subjected to a force from the torso of an occupant of the seat, for example, during a rear impact. The energy absorbing force limiter provides a first resistive force resisting the pivotal movement, and a second resistive force during a second subsequent pivotal movement. The resistive force provided during the first pivotal movement is dependent upon the energy of the rear impact. If the rear impact is low energy rear impact, the resistive force is relatively low whereas if the rear impact is a high-energy rear impact, the resistive force is relative high.

5 Claims, 3 Drawing Sheets

VEHICLE SEAT

FIELD OF THE INVENTION

The present invention relates to a vehicle seat and more particularly, relates to a vehicle seat intended for use in a motor vehicle such as a motor car.

BACKGROUND OF THE INVENTION

It has been appreciated that if a motor vehicle, such as a motor car, is involved in a rear-end collision or rear impact—that is to say if a following vehicle runs into the back of the car—the occupants of the struck car often suffer from neck injuries.

It is to be understood that during a rear-end collision of this type, the vehicle that is struck is subjected to a forward acceleration. This imparts a forward acceleration to the seats of the vehicle. The squab and the back of each occupied seat engage the posterior and torso of the occupant of the seat and impart a substantial acceleration to the posterior and torso of the occupant. However, no corresponding acceleration is immediately imparted to the head of the occupant. The head is a part of the body that has substantial mass, and consequently the head has substantial inertia.

Thus, while the posterior and torso of the occupant of the vehicle are accelerated forwardly as a result of the rear-end collision, the head of the occupant of the vehicle initially remains stationary. This causes the neck initially to adopt a "S"-shaped configuration as the lower part of the neck moves forwardly, while remaining vertical, and the upper part of the neck remains in its initial position. Subsequently, the head begins to rotate, and the neck then occupies a curved configuration. The head subsequently moves forwardly. Research has shown that "whiplash" injuries may occur when the neck adopts the "S"-shaped configuration, if the head is moving, relative to the torso, at a substantial speed.

SUMMARY OF THE INVENTION

The present invention seeks to provide an improved vehicle seat in which the risk of "whiplash" injuries occurring to the occupant of the seat during a rear-end collision are reduced.

According to this invention there is provided a vehicle seat, the seat comprising a squab and a back, the back being mounted for pivotal movement relative to the squab of the seat incorporating energy absorbing force limiting components to absorb energy as the back of the seat moves rearwardly when subjected to a force from the torso of an occupant of the seat, if a vehicle in which the seat is mounted is involved in a rear impact, the energy absorbing force limiting components providing a first resistive force resisting the pivotal movement during a first predetermined pivotal movement, and a second resistive force during a second subsequent pivotal movement, the resistive force provided during the first pivotal movement being dependent upon the energy of the rear impact.

Preferably the energy absorbing force limiting components comprises elements to provide the first resistive force comprising an energy absorbing force limiting device and a dampening spring.

Conveniently the energy absorbing force limiting device and the dampening spring are connected in series between the back of the seat and an element mounted on the squab of the seat.

Advantageously the dampening spring comprises a spring connected in parallel with a fluid-filled cylinder containing a double acting piston, the opposed ends of the cylinder being inter-connected by a parallel connection of a non-return valve and a constriction.

Preferably the energy absorbing force limiting components comprise a framework present within the back of the set adapted to deform when subjected to a predetermined force.

Advantageously the energy absorbing force limiting components comprise an energy absorbing force limiter adapted to provide said second resistive force during the second subsequent pivotal movement.

Conveniently the back of the seat is mounted for pivotal movement between predetermined limits relative to a support, the support being pivotally mounted to the squab of the seat, the energy absorbing force limiter providing the second resistive force during the second subsequent pivotal movement being adapted to provide the resistive support on pivotal movement of said support.

In order that the invention may be more readily understood, and so that further features thereof may be appreciated, the invention will now be described, by way of example, with reference to the accompanying drawings in which:

DETAILED DESCRIPTION OF THE PREFERED EMBODIMENTS

Figure 1:
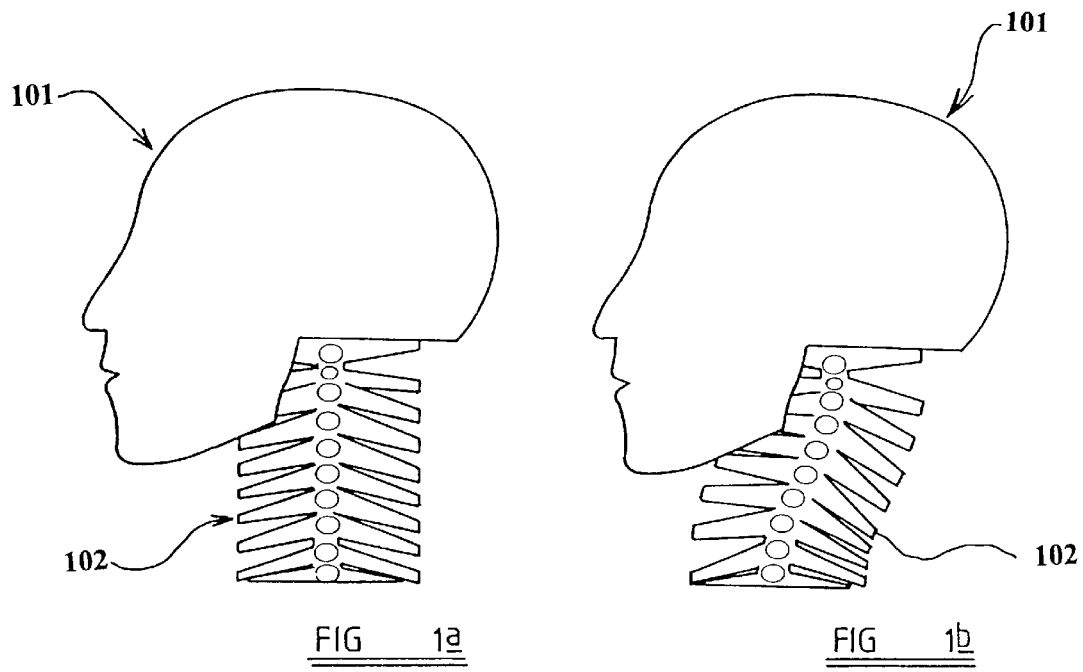
FIG. 1 is a diagrammatic view comprising four illustrations showing the condition of head and neck of an occupant of a vehicle in a rear collision situation where a conventional seat is used.

Referring initially to FIG. 1 of the accompanying drawings, illustration A shows the position of the head 101 and neck 102 of the occupant of a motor vehicle during ordinary conditions. The head and neck would occupy this position if, for example, the vehicle were stationary.

Assuming that the vehicle was then subjected to a rear impact, the posterior and torso of the occupant of the vehicle would be moved forwardly, as a consequence of the forward movement of the vehicle and the forward movement of the seat mounted in the vehicle. The head 101 of the occupant would tend to remain stationary. A neck 102 of the occupant would then have the condition shown in illustration B. The neck 102 here has a "S" configuration. Subsequently, as shown in illustration C, the head 101 moves rearwardly, thus giving the neck 102 an arcuate configuration and, if the head 101 does not impinge on the head-rest, the head 101 can move to the tilted back position shown in illustration D where the neck 102 is bent back (hyperextension) with a very significant degree of curvature.

It is believed that if the neck is subject to the distortions shown in illustrations A to D, the hydro-dynamic pressure of the fluid within the spine can rise suddenly, when the neck adopts the "S"-shaped configuration, thus imparting pressure shocks to parts of the central nervous system in contact with that fluid. Also, injuries may well be imparted to the ganglia. It is believed that this is why patients with so-called "whiplash" injuries may suffer from the effects of those injuries for a long time. Even though a typical rear impact collision occurs with a relatively low impact speed, these collisions are responsible for a large number of relatively serious injuries each year.

While it has been proposed previously to provide a seat having a seat back which moves rearwardly, against a retarding force, in the event that a rear impact should occur, such prior proposals have not differentiated between a low speed or low intensity rear impact, and a high speed or high intensity rear impact.

Figure 2:
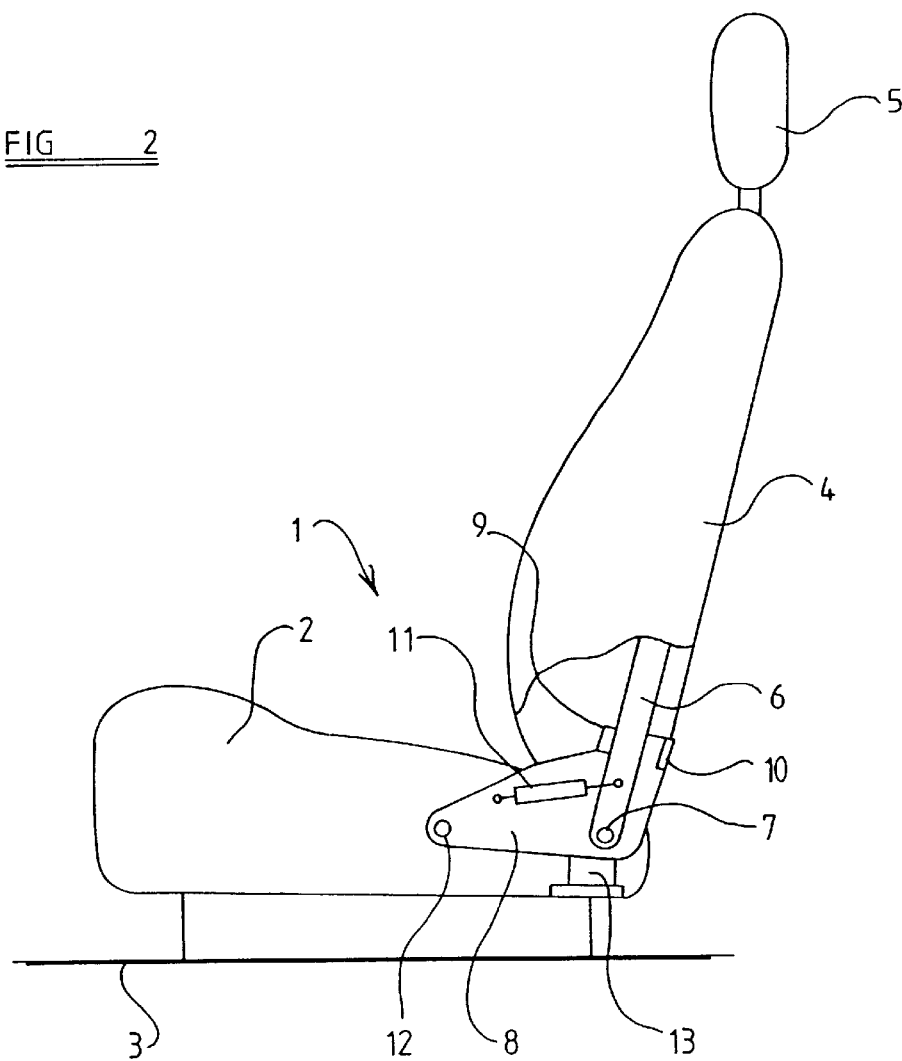
FIG. 2 is a diagrammatic view of a seat in accordance with the invention.

Referring to FIG. 2 of the accompanying drawings, a seat 1 for use in a vehicle such as a motor car is illustrated. The seat 1 comprises a squab 2 adapted to be secured to the floor 3 of the motor vehicle. The squab 2 may be secured to the floor 3 by a carriage slideable along rails mounted in the floor. The seat 1 is provided with a back 4, the back 4 carrying a head-rest 5. The back 4 incorporates a frame, part of which is visible in FIG. 1. The frame member 6 is pivotally connected by a pivot 7 to a support plate 8 which is secured to the squab 2 of the seat 1. The frame member 6 can pivot about the pivot 7 between a forward-most position as illustrated in FIG. 2 in which the frame member 6 contacts a stop 9, and a rear-most position when the frame member 6 contacts a stop 10. A force limiter assembly 11, which will be described hereinafter in greater detail, is connected between the frame member 6 and the support plate 8.

The support plate 8 is actually connected to the squab 2 of the seat 1 by a pivotal connection (pivot axis) 12. The support plate 8 can thus effect a pivotal motion about the axis defined by the pivotal connection 12. The support plate 8 is associated with an energy absorbing force limiter 13 connected between the support plate 8 and the squab 2 of the seat 1. Thus, if the combination of the seat back 4 and the support plate 8 pivot about the pivot axis 12, the energy absorbing force limiter 13 resists the movement, absorbing energy.

Figure 3:
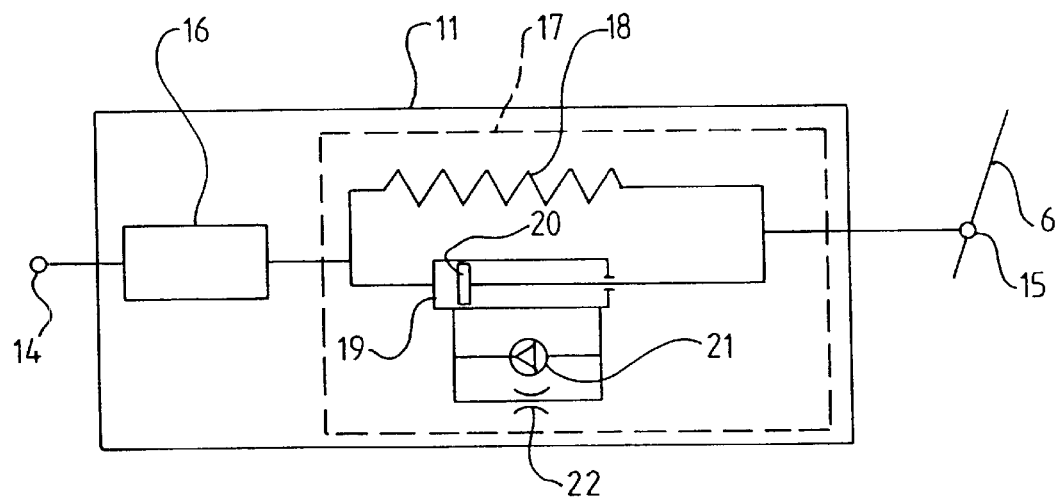
FIG. 3 is an enlarged view of part of the seat of FIG. 2.

Referring now to FIG. 3, the force limiter assembly 11 is illustrated in greater detail.

The force limiter assembly 11 is connected, by connector 14 to the support plate 8 and is also connected, by connector 15 to the frame member 6 forming part of the back 4 of the seat 1. The force limiter assembly 11 comprises a series connection of an energy absorbing force limiting device 16, and a dampening spring (dampening unit) 17. The dampening spring 17 comprises the combination of a spring 18 connected in parallel with a fluid-filled cylinder 19 containing a double acting piston 20, the opposite ends of the cylinder being connected by the parallel connection of a non-return valve 21 and a constriction 22.

Figure 4:
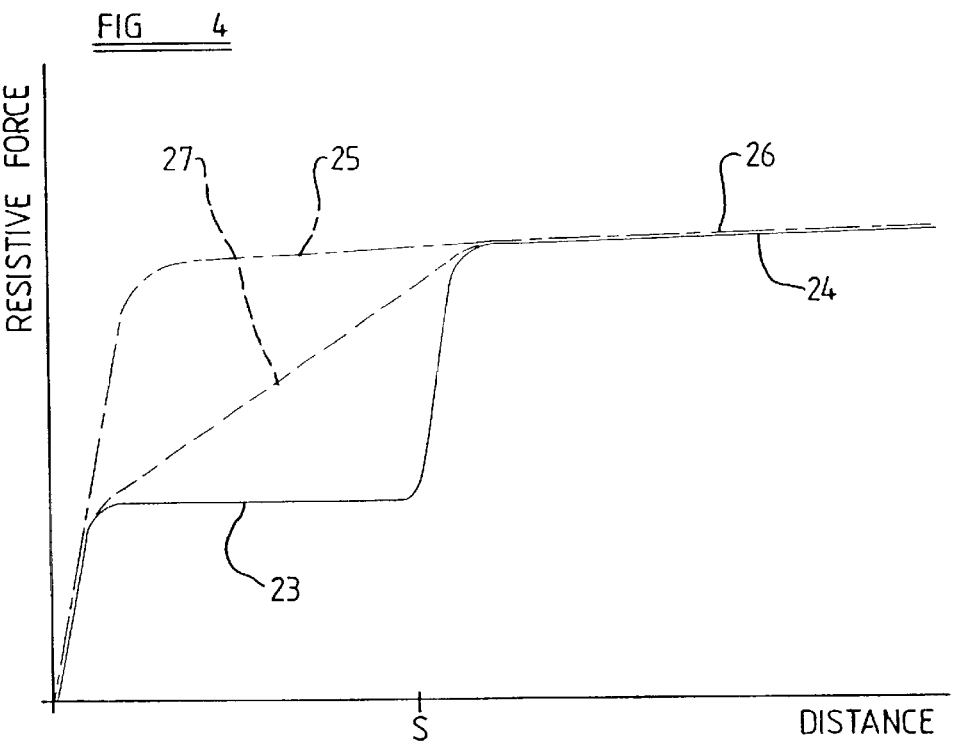
FIG. 4 is a graphical figure provided for proposes of explanation.

If a seat 1 as illustrated, and described with reference to FIGS. 2 and 3 is in a vehicle which is subjected to a low speed or low energy rear impact, the squab 2 of the seat 1 will be accelerated forwardly while the torso of an occupant of the seat 1 will tend to remain stationary due to inertia. The back 4 of the seat 1 will thus be brought into contact with the torso of the occupant of the seat 1, and will start to accelerate the torso of the occupant of the seat 1. Effectively, the torso of the occupant of the seat 1 will apply a rearwardly directed force to the back 4 of the seat 1 causing, initially, the back 4 of the seat 1 to pivot about the pivot axis at pivot 7. The back 4 of the seat 1 thus executes a first pivotal movement. Because the force is a relatively low force, the piston 20 moved to the right within cylinder 19 as shown in FIG. 3, against a resisting bias provided by spring 18 causing fluid present within the cylinder to flow through the constriction 22. The resisting force is thus a relatively low substantially constant resistive force as the back 4 of the seat 1 moves rearwardly, as illustrated by the solid line 23 in FIG. 4, which is a graphical figure showing resistive force plotted against the distance of pivotal movement of the back 4 of the seat 1. The resistivity force is a combination of the force provided by the spring 18 and the effect of fluid flowing through the constriction 22. When the frame member 6 has pivoted about the pivot 7 to such an extent that the frame member 6 engages the stop 10, (shown as point S on the axis of the graph of FIG. 4) if the force applied to the back 4 of the seat 1 is sufficient, the back 4 of the seat 1 executes a second pivot movement during which the support plate 8 pivots about the pivot axis 12, and energy is absorbed by energy absorbing force limiter 13, as shown in the solid line 24 in FIG. 4.

It is to be understood that following the impact, the spring 18 will contract, thus moving the piston 20 towards the left within the cylinder 19. The fluid within the cylinder may easily flow through the non-return valve 21 to facilitate this movement of the piston.

Thus, if the vehicle is involved in a mild rear impact, only the dampening spring 17 will operate, and, if the impact is great enough, the energy absorbing force limiter 13 will also operate.

If, in contrast, the vehicle is involved in a high speed, high energy rear impact, a very substantial acceleration will be imparted to the squab 2 of the seat 1, and to the back 4 of the seat 1. The torso of the occupant, because of its inertia, will impart a substantial force against the back 4 of the seat 1. The force will tend to move the piston 20 very rapidly towards the right within the cylinder as shown in FIG. 3. This will tend to cause fluid to flow very swiftly through the constriction 22. The constriction 22 will prevent the flow of fluid and consequently the dampening spring 17 will become substantially rigid. The energy absorbing force limiting device 16 will consequently extend, absorbing a substantial amount of energy, and thus providing a very substantial force limiting effect as the frame element 6 of the seat back 4 moves pivotally about the pivot 7 to engage the stop 10. When the stop 10 has been engaged, the support plate 8 will pivot about the pivot axis 12. During this pivoting movement energy will be absorbed by the energy absorbing force limiter 13.

The resisting force will thus be high during the first pivotal movement as the frame member 6 moves from stop 9 to stop 10, because the energy absorbing force limiting device 16 is operating. This is shown as the dashed line 23 in FIG. 4.

Should the vehicle be involved in an intermediate energy and intermediate speed rear impact, the force limit assembly 11 may operate so that during the movement of the frame member 6 between the stop 9 and the stop 10, part of the energy is absorbed by the force limiting device 16 and part of the energy is absorbed by the dampening unit 17. This is shown by the dotted line 27 in FIG. 4.

It is to be appreciated that, in a vehicle seat 1 as described above, the reaction of the seat 1 to a rear impact depends upon the energy of the rear impact. In a low energy rear impact, the torso of the occupant is effectively accelerated very gradually by the back 4 of the seat 1, thus minimizing the risk of injury to the torso.

However, in a high energy or high speed rear impact, it is not practicable to accelerate the torso of the occupant with only a relatively low acceleration, by permitting the back 4 of the seat 1 to move rearwardly in an appropriate manner, since there would be a grave risk that the back 4 of the seat 1 would be substantially horizontal before the occupant of the seat 1 had been given a sufficient acceleration. This would be clearly disadvantageous since if the back 4 of the seat 1 did approach the horizontal condition, the occupant of the seat 1 would tend to slide rearwardly out of the seat 1, due to inertia, with a very grave risk of severe injuries occurring.

Thus, in the seat 1 of the present invention, if the vehicle in which the seat 1 is mounted is subjected to a high energy rear impact, the seat 1 responds by giving the torso of the occupant a relatively high acceleration while still minimizing that acceleration as much as practicable. In an intermediate situation, the seat 1 provides an intermediate response.

It is to be appreciated that in the described embodiments of the invention the back 4 of the seat 1 effects the two movements, the first movement being a pivotal movement about the pivot axis at pivot 7 and the second movement being a pivotal movement about the pivotal connection 12, with both movements being against appropriate force limiting components. It is to be understood that the second movement could, instead of being moved about a pivot such as the pivotal connection 12, comprise a deformation of the frame forming the back 4 of the seat 1.

It is also to be understood that while in the described embodiment there are two pivotal movements about two pivot axes (7,12), the two pivotal movements could be about a single pivot axis.

In FIGS. 2 and 3, energy absorbing force limiters have been illustrated in a totally schematic way. Different types of energy absorbing force limiters could be utilised.

Figure 5:
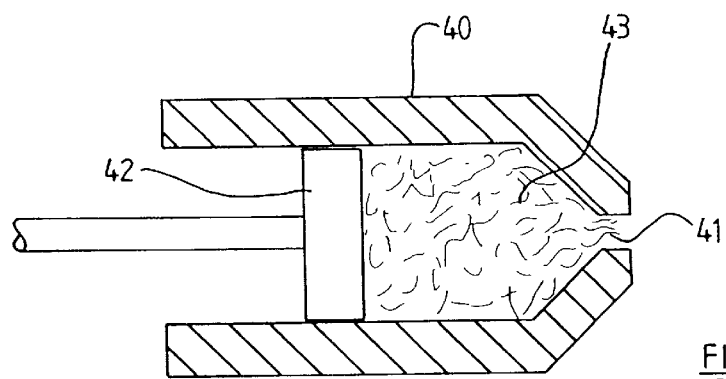
FIG. 5 is a view of an energy absorbing force limiter.

FIG. 5 illustrates one type of force limiter that can be used, comprising a cylinder 40 formed of an appropriate material which defines an outlet orifice 41. A piston 42 is present within the cylinder. The space between the piston and the outlet orifice 41 is filled with a deformable material 43. The deformable material 43 may comprise lead or a plastic material. The cylinder 40 is fixed in position and the piston 42 is connected to the movable element. Thus, for example, the cylinder 40 may be connected to the outer frame, with the piston 42 being connected to the inner frame. Alternatively, the cylinder 40 may be connected to the side piece 18, with the piston 42 being connected to the side element 14 of the main frame.

The arrangement is such that as the movable element moves, this piston 42 is driven into the cylinder 40, thus ejecting the material 43 that is initially inside the cylinder through the outlet orifice 41. This provides a force limiting effect.

Figure 6:
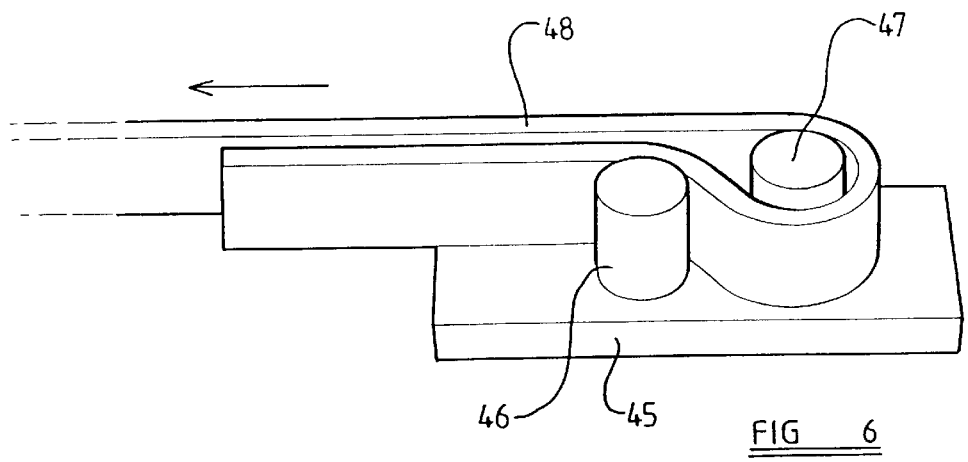
FIG. 6 is a view of an alternative energy absorbing force limiter.

An alternative form of force limiter is shown in FIG. 6. A plate 45 is provided which supports two upwardly extending posts 46,47. A metal strip 48 is located to substantially surround one post 47, then to pass through the gap between the post 47 and 46, subsequently lying adjacent another part of the strip 48. If the free end 48 of the strip is pulled, the metal strip will slide through the posts 46 and 47, with the metal strip being deformed. This will absorb energy.

What is claimed is:

1. A vehicle seat, the seat comprising a squab and a back, wherein:

the back is mounted for pivotal movement relative to the squab of the seat, the squab of the seat incorporating energy absorbing force limiting means adapted to absorb energy as the back of the seat moves rearwardly when subjected to a force from the torso of an occupant of the seat so that if a vehicle in which the seat is mounted is involved in a rear impact, the energy absorbing force limiting means provides a first resistive force resisting the pivotal movement during a first predetermined pivotal movement, and a second resistive force during a second pivotal movement, the resistive force provided during the first pivotal movement being dependent upon the energy of the rear impact;

wherein the energy absorbing force limiting means comprises elements to provide the first resistive force comprising an energy absorbing force limiting device and a dampening spring; and wherein the dampening spring comprises a spring connected in parallel with a fluid-filled cylinder containing a double acting piston, the opposite ends of the cylinder being interconnected by a parallel connection of a non-return valve and a constriction.

2. The vehicle seat according to claim 1 wherein the energy absorbing force limiting device and the dampening spring are connected in series between the back of the seat and an element mounted on the squab of the seat.

3. The seat according to claim 1 wherein the energy absorbing force limiting means comprises a frame present within the back of the seat adapted to deform when subjected to a predetermined force.

4. The seat according to claim 1 wherein the energy absorbing force limiting means comprises an energy absorbing force limiter adapted to provide said second resistive force during the second pivotal movement.

5. The vehicle seat according to claim 4 wherein the back of the seat is mounted for pivotal movement between predetermined limits relative to a support, the support being pivotally mounted to the squab of the seat, the energy absorbing force limiter providing the second resistive force during the second subsequent pivotal movement being adapted to provide the resistive support on pivotal movement of said support.

* * * * *